United States Patent [19]

Hashimoto et al.

[11] 4,433,708
[45] Feb. 28, 1984

[54] AIR BAG SYSTEM

[75] Inventors: Nobuyuki Hashimoto, Toyota; Takemi Hattori, Kariya, both of Japan

[73] Assignee: Aisin Seiki Kabushiki Kaisha, Kariya, Japan

[21] Appl. No.: 335,456

[22] Filed: Dec. 29, 1981

[30] Foreign Application Priority Data

Jan. 10, 1981 [JP] Japan ............................ 56-1309[U]

[51] Int. Cl.³ .............................................. B65B 3/04
[52] U.S. Cl. ................................... 141/114; 141/234; 141/317
[58] Field of Search ................. 141/10, 114, 236, 234, 141/1–9, 11, 12, 313–317, 67, 68, 285–310; 5/449, 453, 455, 456

[56] References Cited

U.S. PATENT DOCUMENTS

| | | | |
|---|---|---|---|
| 2,136,510 | 11/1938 | Jensen . | |
| 3,111,968 | 11/1963 | Headrick | 141/236 |
| 3,326,601 | 6/1967 | Vanderbilt et al. . | |
| 3,363,941 | 1/1968 | Wierwille . | |
| 4,102,364 | 7/1978 | Leslie et al. | 141/10 |

Primary Examiner—Houston S. Bell, Jr.
Attorney, Agent, or Firm—Burns, Doane, Swecker & Mathis

[57] ABSTRACT

An air bag system includes a plurality of air bags; a pump for supplying said air bags with air, check valves, each disposed on respective pipes communicating said pump with the air bags; and relief valves, each for discharging the air from respective air bag. The air bag further includes stop valves, each provided between said pump and respective check valves for inflating each air bag independently. The contour of a seat having air bags contained therein may be changed so as to fit an occupant.

2 Claims, 4 Drawing Figures

AIR BAG SYSTEM

BACKGROUND

The present invention relates to an air bag system, in particular, to an air bag system contained in, for example, an automobile seat back rest to change the contour of the seat to fit an occupant.

There has been a conventional air bag system as shown in FIG. 1. Each relief valve 24 of respective air bags 3 is opened to fit the seat back rest to an occupant after all the air bags 3 has been fully inflated by means of a single pump 1. Accordingly the conventional air bag system has a disadvantage in that it requires a long amount of time since the air which has been fully charged into air bags is released to the atmosphere after the charging. This disadvantage is significant when the inflation is manually carried out. The conventional air bag system has another disadvantage in that it is difficult to adjust the contour of the seat since the feeling to a body is easily changed during the adjustment of the other air bags.

SUMMARY OF THE INVENTION

It is therefore a purpose of the present invention to provide an air bag system in which the best contour of the seat having a plurality of air bags contained therein may be obtained in a short period of time.

These and other purposes and advantages of the present invention will become more apparent from the following detailed description and the drawings.

In the present invention, the purpose of the present invention is accomplished by an air bag system in which air bags are inflated one by one by means of normally closed valves, each provided between a pump and a check valve assigned to respective air bags.

According to the present invention, an air bag system includes a plurality of air bags; a pump for supplying the air bags with air; check valves, each disposed on respective pipes communicating said pump with the air bags; and relief valves, each for discharging the air from respective air bags. The air bag system further includes stop valves, each provided between the pump and respective check valves for inflating each air bag independently.

The contour of a seat having air bags contained therein may be changed so as to fit an occupant through manipulating the respective stop valves.

DETAILED DESCRIPTION OF THE PREFERRED EMBODIMENT

Figure 1:
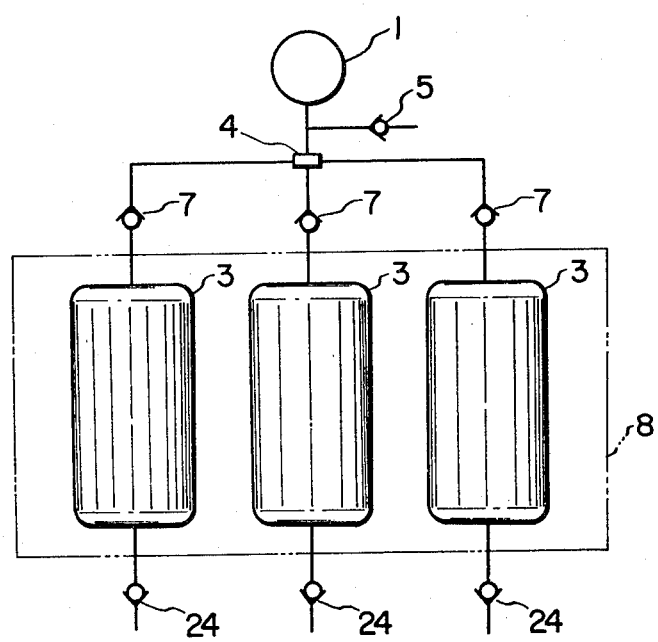
FIG. 1 is a pneumatic diagram showing a conventional air bag system.
Figure 2:
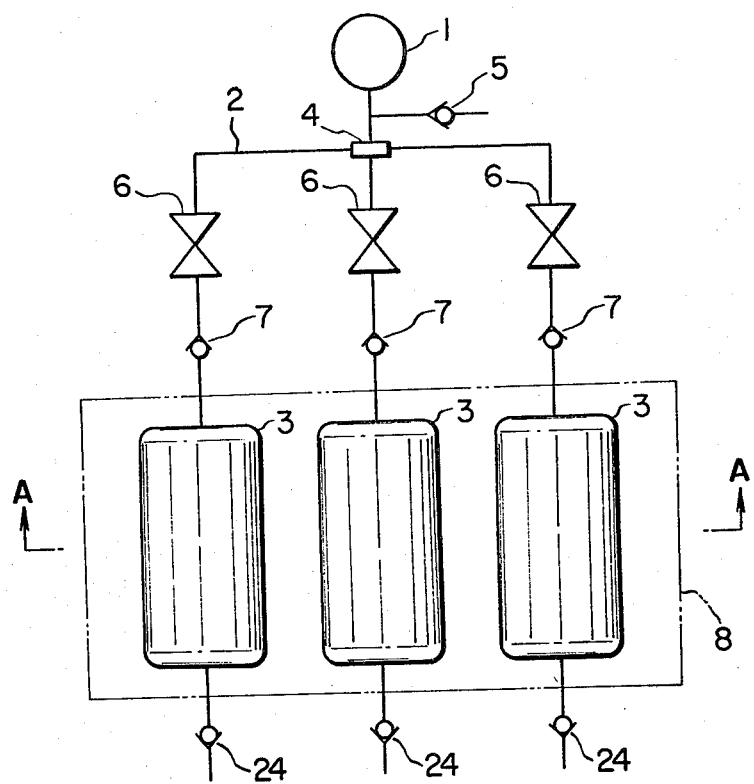
FIG. 2 is a pneumatic diagram showing an air bag system of the present invention.

Referring now to FIG. 2, a pump 1 is of the manual squeeze type in which air is pumped out by squeezing the pump. Alternatively the pump 1 may be an other mechanical pump or a suitable pneumatic pressure source. The pump 1 is connected with a plurality of (three in the shown embodiment) air bags 3 through a pipe 2. The pipe 2 is branched to air bags 3a, 3b and 3c through a joint 4. A relief valve 5 is provided between the pump 1 and joint 4 for protecting the air bag system from the excessive pressure.

The pipes which are branched from the joint 4 are connected with respective air bags in a seat back through a stop valve 6 and a check valve 7 for introducing the air discharged from the air pump 1 to air bags 3. The stop valve 6 supplies the air from the pump 1 to a specified air bag 3. The stop valves 6 may be of the manual type in which it is opened only during the depression with a finger or of the solenoid type. The check valve 7 provides unidirectional air flow from the stop valve 6 to the air bag 3 and is essential in use of the manual air pump which supplies air in a pulsated manner.

Figure 4:
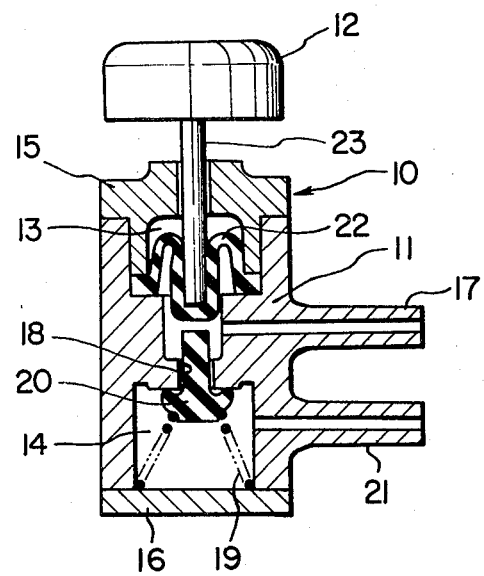
FIG. 4 is a sectional side elevation showing a valve in which a stop valve is integral with a check valve.

In the embodiment shown in FIG. 2 the stop valve 6 is separated from the check valve 7. Alternatively they may be replaced with a valve 10 having both functions of the stop and check valves 6 and 7 as shown in FIG. 4. The valve 10 comprises mainly a cylinder body 11 and a knob 12. Two chambers, namely a chamber 13 on the side of the pump 1 and a chamber 14 on the side of the air bag are defined in the cylinder body 11. The cylinder body 11 is closed at opposite ends by upper and lower end caps 15 and 16. The chamber 13 on the side of the pump 1 is communicated with the pump 1 through a hollow pipe 17 projecting from the side wall of the cylinder body 11. However the air discharged from the pump 1 can not flow into the chamber 14 on the side of the air bag since a communication hole is normally closed by a spring 19 and a poppet valve 20. An elastic member 22 of rubber and the lower end of a stem 23 supported by the member 22 are positioned inside the chamber 13 on the side of the pump 1.

The chamber 14 on the side of air bag is communicated with the air bags 3 through a hollow pipe 21 projecting from the side wall of the cylinder 11. A spring 19 and a poppet valve 20 are disposed inside the chamber 14. The stem 23 is normally positioned at a position as shown in FIG. 4.

When the knob 12 at the upper end of the stem 23 is depressed downward with a finger, the stem 23 and the elastic member 14 cause the poppet valve 20 to move downward against the spring 19. The communication hole 18 is rendered open so that the air discharged from the pump 1 flows into air bags 3. On release of the finger from the knob 12 the poppet valve 22 is returned to the original normal position so that the communication hole 18 is closed. The poppet valve 20 also functions as a check valve for preventing the air which has been introduced into the air bags 3 from back-flowing to the chamber 13 on the side of the pump.

Figure 3:
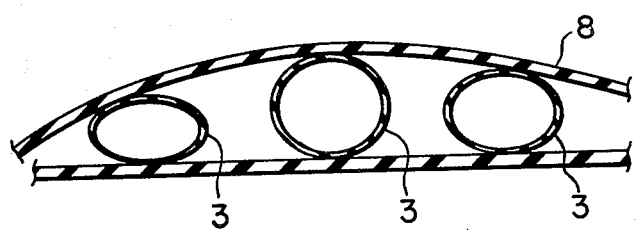
FIG. 3 is a sectional view along the line A and A in FIG. 2.

Air bags 3 are contained in the seat back rest of the seat 8 as shown in FIG. 3. Each air bag 3 is inflated into various sizes by opening a corresponding stop valve so that desired contours of the back seat may be selected.

The relief valve 24 disposed at each air bags 3 releases the air in the air bag 3 so that desired pressures and sizes of the air bag 3 may be selected.

In operation of the air bag system of the present invention, the occupant operates the pump 1 while the stop valve 6 corresponding to a given air bag is kept open. The occupant should repeatedly squeeze the pump 1 until the air bag 3 becomes a desired pressure and size if the pump 1 is of the squeeze type. Then another stop valve 6 corresponding to the another air bag 3 is opened and the same operation is repeated.

Thereafter adjustment is carried out by discharging the air so that the seat back rest containing air bags will fit the occupant.

The air bag system of the present invention has the advantages in that the adjustment of each air bag may be completed in a short period of time since air bags are inflated one by one and in that adjustment of air bags is easy without giving uncomfortableness to the occupant since the occupant can inflate the air bags following to a preferred order, i.e., from an air bag which is most important with respect to feeling and positioning of the occupant's body.

The principles, preferred embodiments and mode of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. An air bag system, comprising a plurality of air bags, a pump for supplying each of said air bags with air through a respective pipe, dual function valves for operating as both a check valve and a stop valve, one of said dual function valves being arranged in each of the pipes communicating said pump with a respective one of the air bags, a relief valve for discharging air from each of the air bags, each of said dual function valves including a poppet valve biased by a spring and arranged in a chamber communicating with the respective air bag, the poppet valve acting as a check valve for the respective air bag to prevent outflow of air therefrom and being manually operable to act as a stop valve for opening and closing communication between the pump and the respective air bag for selectively inflating the respective air bag such that the plurality of air bags may be inflated individually.

2. The air bag system defined in claim 1, in which said dual function valves are normally closed valves.

* * * * *